United States Patent
Svendsen et al.

(10) Patent No.: US 8,332,425 B2
(45) Date of Patent: *Dec. 11, 2012

(54) METHOD AND SYSTEM FOR GENERATING MEDIA RECOMMENDATIONS IN A DISTRIBUTED ENVIRONMENT BASED ON TAGGING PLAY HISTORY INFORMATION WITH LOCATION INFORMATION

(75) Inventors: Hugh Svendsen, Chapel Hill, NC (US); Eugene Matthew Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,746

(22) Filed: Nov. 1, 2011

(65) Prior Publication Data

US 2012/0054233 A1    Mar. 1, 2012

Related U.S. Application Data

(63) Continuation of application No. 11/963,050, filed on Dec. 21, 2007, now Pat. No. 8,060,525.

(51) Int. Cl.
*G06F 17/30* (2006.01)
(52) U.S. Cl. ........................... 707/769; 707/899
(58) Field of Classification Search ........................ None
See application file for complete search history.

(56) References Cited

U.S. PATENT DOCUMENTS

| | | | |
|---|---|---|---|
| 5,592,511 | A | 1/1997 | Schoen et al. |
| 7,035,871 | B2 | 4/2006 | Hunt et al. |
| 7,130,608 | B2 | 10/2006 | Hollstrom et al. |
| 7,149,961 | B2 | 12/2006 | Harville et al. |

(Continued)

FOREIGN PATENT DOCUMENTS

WO    00/04730 A1    1/2000

(Continued)

OTHER PUBLICATIONS

Abstract, Elliott, G.T. and Tomlinson, B., "Personal Soundtrack: context-aware playlists that adapt to user pace," Conference on Human Factors in Computing Systems 2006 (CHI '06), Apr. 22-27, 2006, Montreal, Quebec, Canada, pp. 736-741, ACM Press, New York, NY, found at <http://portal.acm.org/citation.cfm?id=1125451.1125599>, ACM Portal, printed Oct. 2, 2007, 3 pages.

(Continued)

*Primary Examiner* — Hung Q Pham
(74) *Attorney, Agent, or Firm* — Withrow & Terranova, PLLC

(57) ABSTRACT

A computer-implemented method and system are provided for generating media recommendations in a media recommendation network. Aspects of the method and system include receiving by a server a plurality of play histories of media items from a plurality of users of devices, wherein at least a portion of the media items are tagged with corresponding time and location data indicating a time and location of play; receiving by the server a media recommendation request from a requester, including receiving seed information indicating a current location of the requester; using at least one of user preferences of the requester and the seed information to identify correlated users from which to search corresponding play histories from among the plurality of play histories; comparing the seed information to the corresponding play histories and generating a list of related media items contained therein; and returning the list of related media items to the requester.

37 Claims, 8 Drawing Sheets

U.S. PATENT DOCUMENTS

| | | | |
|---|---|---|---|
| 7,227,071 | B2 | 6/2007 | Tagawa et al. |
| 7,245,925 | B2 | 7/2007 | Zellner |
| 7,469,283 | B2 | 12/2008 | Eyal et al. |
| 7,680,699 | B2 * | 3/2010 | Porter et al. ............ 705/26.1 |
| 7,765,192 | B2 | 7/2010 | Svendsen |
| 7,827,110 | B1 | 11/2010 | Wieder |
| 8,060,525 | B2 | 11/2011 | Svendsen et al. |
| 8,117,193 | B2 | 2/2012 | Svendsen et al. |
| 2002/0183059 | A1 | 12/2002 | Noreen et al. |
| 2003/0137531 | A1 | 7/2003 | Katinsky et al. |
| 2004/0073919 | A1 | 4/2004 | Gutta et al. |
| 2005/0021470 | A1 | 1/2005 | Martin et al. |
| 2006/0085349 | A1 | 4/2006 | Hug |
| 2006/0143236 | A1 | 6/2006 | Wu |
| 2007/0043766 | A1 | 2/2007 | Nicholas et al. |
| 2007/0074617 | A1 | 4/2007 | Vergo |
| 2007/0174147 | A1 | 7/2007 | Klein, Jr. |
| 2007/0182532 | A1 | 8/2007 | Lengning et al. |
| 2007/0233743 | A1 * | 10/2007 | Rosenberg ............ 707/104.1 |
| 2007/0250571 | A1 * | 10/2007 | Griffin, Jr. ............ 709/204 |
| 2007/0282949 | A1 | 12/2007 | Fischer et al. |
| 2008/0016205 | A1 | 1/2008 | Svendsen |
| 2008/0052380 | A1 | 2/2008 | Morita et al. |
| 2008/0085769 | A1 | 4/2008 | Lutnick et al. |
| 2008/0091771 | A1 | 4/2008 | Allen et al. |
| 2008/0162435 | A1 | 7/2008 | Dooms et al. |
| 2008/0209013 | A1 | 8/2008 | Weel |
| 2008/0243733 | A1 | 10/2008 | Black |
| 2008/0261516 | A1 | 10/2008 | Robinson |
| 2008/0313308 | A1 * | 12/2008 | Bodin et al. ............ 709/219 |
| 2009/0013347 | A1 | 1/2009 | Ahanger et al. |
| 2009/0049390 | A1 * | 2/2009 | Nason et al. ............ 715/747 |
| 2009/0055376 | A1 | 2/2009 | Slaney et al. |
| 2009/0063414 | A1 * | 3/2009 | White et al. ............ 707/3 |
| 2009/0063971 | A1 | 3/2009 | White et al. |
| 2009/0077041 | A1 | 3/2009 | Eyal et al. |
| 2009/0093300 | A1 | 4/2009 | Lutnick et al. |
| 2009/0164429 | A1 | 6/2009 | Svendsen et al. |
| 2009/0164516 | A1 | 6/2009 | Svendsen et al. |
| 2010/0185732 | A1 | 7/2010 | Hyman |
| 2011/0016483 | A1 | 1/2011 | Opdycke |
| 2011/0034121 | A1 | 2/2011 | Ng et al. |
| 2012/0072418 | A1 | 3/2012 | Svendsen et al. |

FOREIGN PATENT DOCUMENTS

| | | |
|---|---|---|
| WO | 2006079973 A1 | 8/2006 |

OTHER PUBLICATIONS

Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

Mascia, J. and Reddy, S., "cs219 Project Report—Lifetrak: Music in Tune With Your Life," Department of Electrical Engineering, UCLA '06, Los Angeles, California, copyright 2006, ACM, 11 pages.

Oliver N. and Kreger-Stickles, L., "PAPA: Physiology and Purpose-Aware Automatic Playlist Generation," In Proc. of ISMIR 2006, Victoria, Canada, Oct. 2006, 4 pages.

Oliver, N. and Flores-Mangas, F., "MPTrain: A Mobile, Music and Physiology-Based Personal Trainer," MobileHCI'06, Sep. 12-15, 2006, Helsinki, Finland, 8 pages.

Pike, S., "intuiTunes—Enhancing the Portable Digital Music Player Experience," Oct. 21, 2005, pp. 1-26.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

* cited by examiner

| PLAY HISTORY ENTRY 400 | GUID 402 | PLAY LOCATION 404 | TIMESTAMP 406 |

| INTERMEDIATE RESULTS 800 |||||
|---|---|---|---|---|
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |
| MEDIA ID 802 | USER ID 804 | USER WEIGHT 806 | MEDIA ID WEIGHT 808 | SCORE 810 |

*FIG. 8*

| MEDIA RECOMMENDATION 46 ||||
|---|---|---|---|
| CURRENT LOCATION || 502 ||
| TERMINATION CONDITION || 510 ||
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |
| MEDIA ID | 802 | SCORE | 810 |

*FIG. 9*

METHOD AND SYSTEM FOR GENERATING MEDIA RECOMMENDATIONS IN A DISTRIBUTED ENVIRONMENT BASED ON TAGGING PLAY HISTORY INFORMATION WITH LOCATION INFORMATION

RELATED APPLICATION

The present application is a continuation of U.S. patent application Ser. No. 11/963,050, filed Dec. 21, 2007, the disclosure of which is hereby incorporated herein by reference in its entirety.

BACKGROUND

Systems for sharing and generating playlists are known. For example Gracenote Playlist™ by Gracenote® of Emeryville, California, offers playlist generation technology for automatically generating digital music playlists that works in offline devices, including portable MP3 players, as well as desktop applications.

Gracenote Playlist Plus™ allows a user to generate a More Like This ™playlist by selecting one or more songs, albums, or artists as seeds songs, e.g., of a song that is currently playing. Gracenote Playlist then returns a mix of music that contains music from related artists and genres. This is accomplished by Playlist Plus analyzing text data available in file tags, called metadata, and filenames of the music to link the music to an internal database of music information. Playlist Plus uses the Gracenote's proprietary metadata types, which includes a genre system that has more than 1600 individual genre categories and associated relational data. The system lets Playlist Plus find relationships between songs that may be missed by simpler systems. For example, a "Punk Pop" song may be more similar to a "Ska Revival" song than it might be to one belonging to another "Punk" sub-category, such as "Hardcore Punk."

Last.fm Ltd. is a UK-based internet radio and music community website. Using a music recommendation system called "Audioscrobbler", Last.fm™ builds a profile of each user's musical taste by recording details of all the songs the user listens to, either on streamed radio stations or on the user's own computer or music player. This information is transferred to Last.fm's database ("Scrobbled") via a plugin installed into the users' music player. The profile data is displayed on the user's Last.fm profile page for others to see. The site offers numerous social networking features and can recommend and play artists similar to the user's favorites. Users can create custom radio stations and playlists from any of the audio tracks in Last.fm's music library. A user can embed a playlist in their profile page for others to listen, but the playlist needs to have at least 15 streamable tracks, each from different artists.

Similarly, U.S. Pat. No. 7,035,871 B2 entitled "Method and Apparatus for Intelligent and Automatic Preference Detection of Media Content" provides a system for listening to music online by creating a preference profile for a user. When the user signs up for the service and provides details reflecting his preferences and his play history, a preference profile is generated and stored in a preference database. The system analyses the stored profiles in the database and learns from the patterns it detects. The system recommends music to the user with attributes similar to user's play history.

Patent application publication 2006/0143236 AI entitled "Interactive Music Playlist Sharing System and Methods" describes a community media playlist sharing system, where system users upload media playlists in real-time, and which are automatically converted to a standardized format and shared with other users of the community. A playlist search interface module browses the database of media playlists and returns similar playlists of system users based on similarity of one or more of the following inputs from a system user: media identification information, media category information, media relations information, user information, or matching a plurality of media items on respective playlists. Based on the results of the playlist search interface module, the system returns a list of recommended playlists to the user.

Although conventional systems for generating playlists perform for their intended purposes, conventional systems suffer disadvantages that may render the results overbroad for the user's tastes. One disadvantage is that although conventional systems may take into account the playlists of other users, conventional systems fail to analyze the playlists of a specific group of users, and fail to consider peer group influences. For example, the music that a particular teenager listens to may be highly influenced by the music listened to by a group of the teenager's peers, such as his or her friends. A further disadvantage is that conventional systems fail to take into account the fact that the music tastes of a user may be influenced by his or her geographic location when generating playlists.

BRIEF SUMMARY

The exemplary embodiment provides a computer-implemented method and system for generating media recommendations in a media recommendation network. Aspects of the method and system include receiving by a server a plurality of play histories of media items from a plurality of users of devices, wherein at least a portion of the media items are tagged with corresponding time and location data indicating a time and location of play; receiving by the server a media recommendation request from a requester, including receiving seed information indicating a current location of the requester; using at least one of user preferences of the requester and the seed information to identify correlated users from which to search corresponding play histories from among the plurality of play histories; comparing the seed information to the corresponding play histories and generating a list of related media items contained therein; and returning the list of related media items to the requester.

BRIEF DESCRIPTION OF SEVERAL VIEWS OF THE DRAWINGS

FIG. 7A is a diagram showing results of a computation for correlated users represented pictorially in a table.

FIG. 7B is a diagram showing results of a computation for correlated media items represented pictorially in a table.

FIG. 8 a block diagram illustrating an intermediate results table for the list of related media items.

FIG. 9 is a diagram illustrating a media recommendation.

DETAILED DESCRIPTION

The present invention relates to methods and systems for generating media recommendations. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain blocks. However, the method and system operate effectively for other methods having different and/or additional blocks not inconsistent with the present invention.

The present invention relates generally to a method and system for generating media recommendations, such as a list of songs, in response to a user's request for the play histories of other users. A central server of a media service stores and continuously updates the play histories of multiple users. In response to receiving a media recommendation request from a requester and seed information provided from the requester, such as the requester's location, a request processor of the central server identifies correlated users for the requester based on user preferences and the seed information. The seed information is then compared to the play histories of the correlated users. Weights may be assigned to media items in the play histories of the correlated users based on various parameters. The media items are then ranked based on weighted scores and then presented to the requester.

Figure 1:
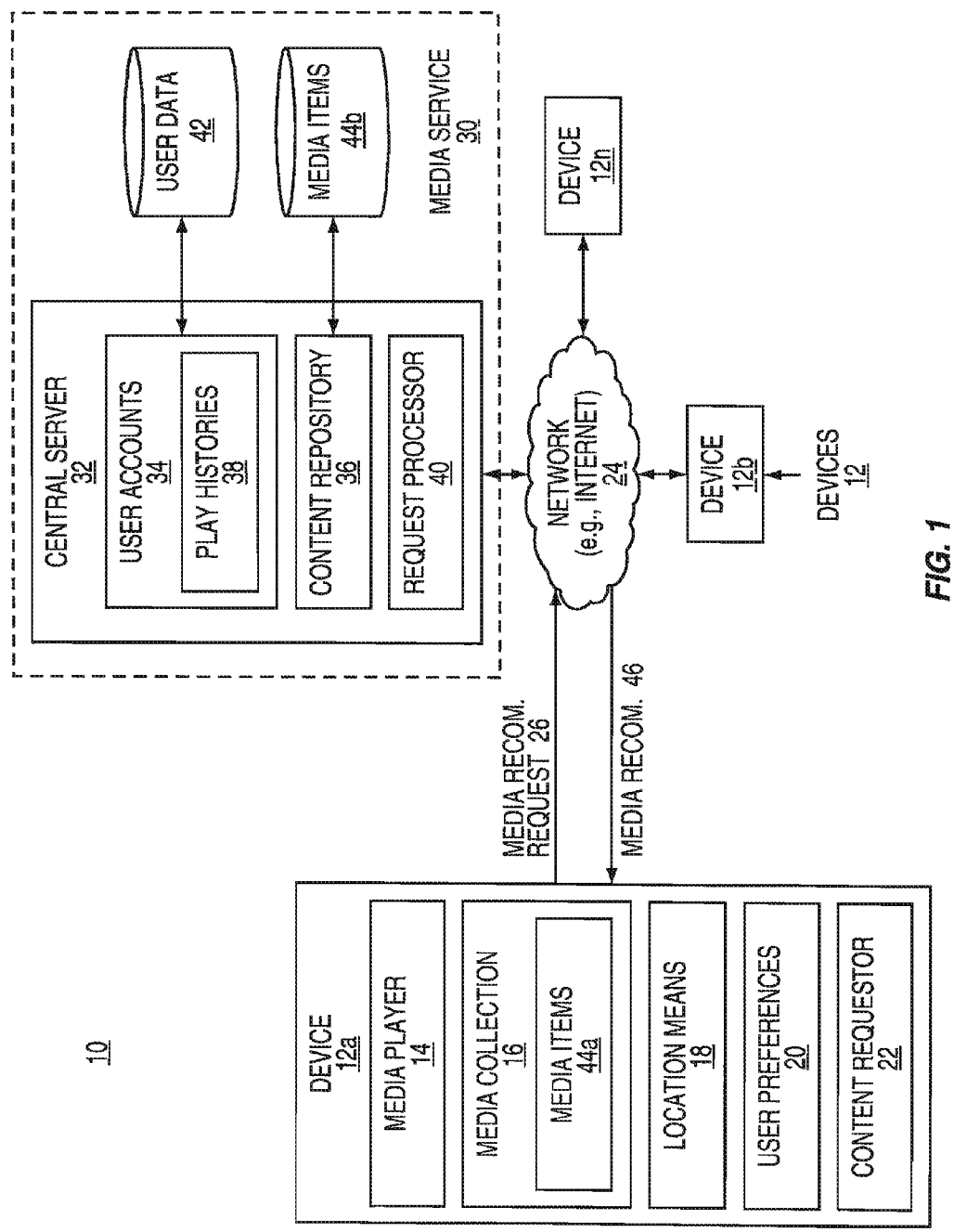
FIG. 1 illustrates a system for generating media recommendations in a distributed media network according to one embodiment.

FIG. 1 illustrates a system 10 for generating media recommendations in a distributed media network according to one embodiment. In general, the system 10 includes a number of devices 12a, 12b, and 12n (collectively referred to as devices 12) that are capable of presenting or playing media items and communicating with a media service, such as, but not limited to, an Internet radio service, via a network 24, such as, but not limited to, the Internet. The media service 30 may have at least one central server 32 connected to the network 24, and a content repository 36.

Each of the devices 12 may include a media player 14, a media collection 16, a location means 18, user preferences 20, and a content requester 22. In one embodiment, the media player 14 may operate to play media items from either the media collection 16 or the content repository 36. The media items 44a from media collection 16 and the media items 44b from the content repository 36 are collectively referred to herein as media items 44.

Note that while the exemplary embodiments may discuss media items 44 in terms of being songs, e.g., mp3s, for clarity and ease of discussion, the term media items 44 is equally applicable to other types of media, such as digital images, slideshows, audio books, digital books, and video presentations, for example. Exemplary video presentations are movies, television programs, music videos, and the like.

In one embodiment, the devices 12 may form a peer-to-peer (P2P) network via the network 24 as described in co-pending application Ser. No. 11/484,130 entitled "P2P Network for Providing Real Time Media Recommendations", filed on Jul. 11, 2006, which is incorporated herein by reference in its entirety. In one embodiment, the devices 12 may form a P2P network through direct communication with one another, while in another embodiment, the devices 12 may form a P2P network via the media service 30. The devices 12 may be any device having a connection to the network 24 and media playback capabilities. For example, the devices 12 may be personal computers, laptop computers, mobile telephones, portable media players, PDAs, or the like having either a wired or wireless connection to the network 24.

The media collection 16 may include any number of media items 44a stored in one or more digital storage units such as, for example, one or more hard-drives, flash memories, memory cards, internal Random-Access Memory (RAM), external digital storage devices, or the like. The user preferences 20 may comprise attributes defining preferences with respect to media items and listening habits, described further below.

The location means 18 may comprise software and/or hardware that singularly or in combination with a remote device is capable of determining a location or position of the device 12. In one embodiment, the location means 18 comprises a hardware device, such as a global positioning system (GPS) sensor, for instance. In another embodiment, the location means comprises components, such as software on the central server 32 capable of determining an Internet protocol (IP) address of the device 12 and for then determining a location from the IP address. In another embodiment, the location means comprises software and/or hardware capable of determining the location of the device 12 based on cell tower triangulation.

As media items 44 are played on the device 12, either from the media collection 16 or streamed over the network 24, the device 12 may generate one or more play histories 38 of the media items 44 that were played, whether the device 12 is online or offline. According to the exemplary embodiment, the play histories 38 of the device 12 may be tagged with time and location data indicating the time and the location that each of the media items 44 were played. Both the play histories 38 and the user preferences 20 may be periodically, or by request, provided to the central server 32 once the device 12 connects with the central server 32.

Either the media player 14 or the content requester 22 can be configured to tag the play histories 38 with the time and location data. And either the media player 14 or the content requester 22 can be configured to provide the play histories 38 and the user preferences 20 to the central server 32, though not necessarily at the same time or at the same frequency. Alternatively, a user of the device 12 may provide the user preferences 20 to the media service 30 over the Internet via a Web browser. The media player 14 and the content requester 22 may be implemented in software, hardware, or a combination of hardware and software. The content requester 22 may alternatively be incorporated into the media player 14.

The central server 32 may host user accounts 34 and a request processor 40. The user accounts 34 may maintain information regarding users of the media service 30 in the form of user data 42, including their uploaded user preferences 20 and play histories 38. The users of the media service 30 preferably correspond to the users of the devices 12. The content repository 36 may maintain media information about any number of media items 44. For example, the media information may include genre, title, release date, band name, genre, country of origin, location of live performances, and the like. In one embodiment, the media service 30 may make the media items 44 available over the network 24 via streaming.

In operation, the content requester 22 of the device 12 sends a media recommendation request 26 from the device 12 to the media service 30. The media recommendation request 26 may be sent with seed information, such as the device's current location. In response to receiving the media recommendation request 26, the request processor 40 computes a result by first correlating a group of user accounts 34 to consider for the computation, then mining the play histories 38 from the correlated user accounts to generate a media recommendation 46 containing a list of one or more related media items 44 substantially matching the seed information, e.g., the device's current location. This process is described below.

Figure 2:
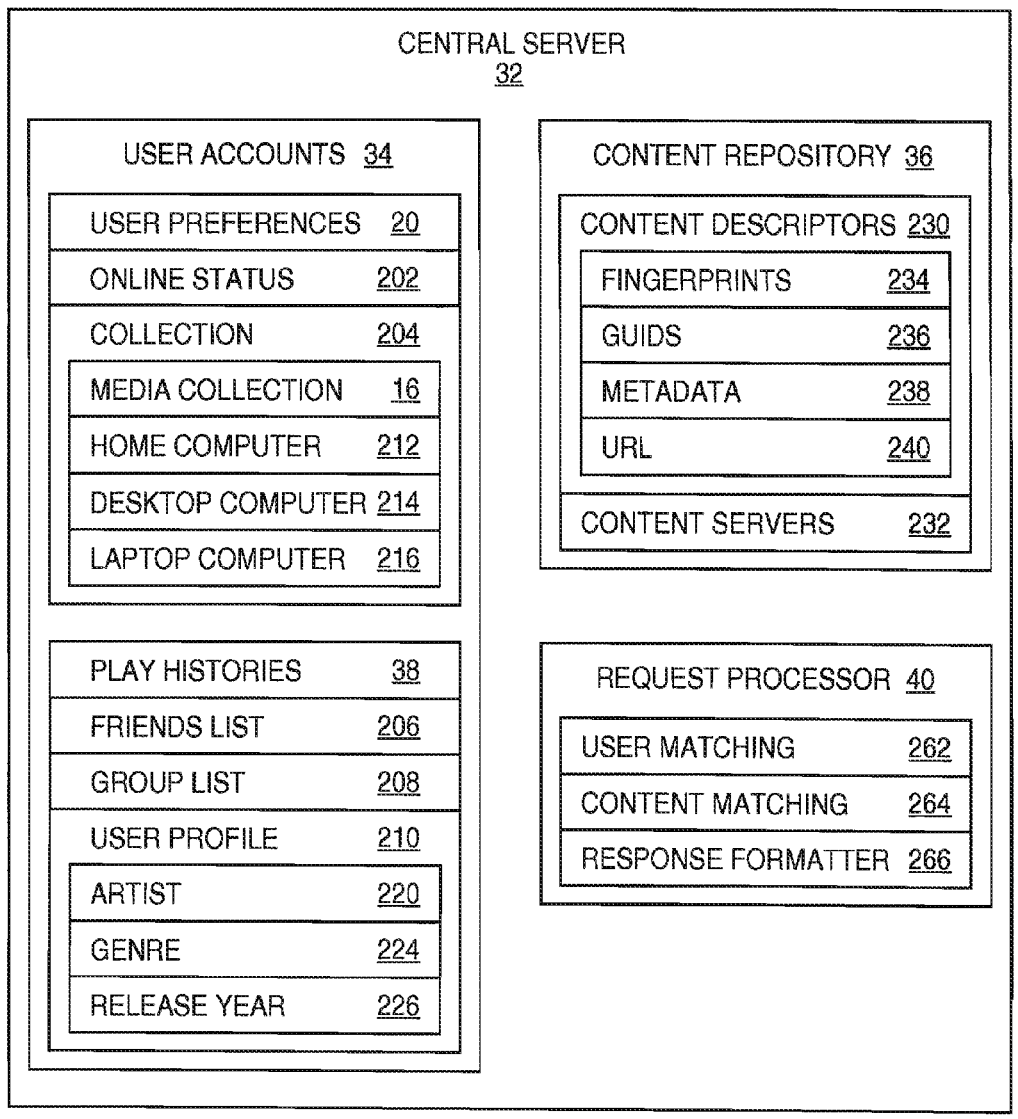
FIG. 2 is a diagram illustrating exemplary components of the central server 32 in further detail according to one embodiment.

FIG. 2 is a diagram illustrating exemplary components of the central server 32 in further detail according to one embodiment. The user account 34 maintained by the server for each user may include the following; user preferences 20, an online status 202, collection information 204, the user's play histories 38, a friends list 206, a group list 208, and a user profile 210.

The user preferences 20 may be used by the media player 14 and the central server 32 to select the order that media items are played for the user depending on whether the media items are being played locally on the device 12, or streamed from the media service 30, respectively. The user preferences 20 may include a weight or priority assigned to each of a number of categories such as user, genre, decade of release, and location/availability. Generally, the location/availability may identify whether songs are stored locally in the media collection 16; available via the media service 30; available for download, and optionally purchase, from an e-commerce service or one of the other devices 12b, 12n; or are not currently available where the user may search for the songs if desired. The user preferences 20 may be stored locally at the device 12 and/or the central server 32. If the device 12 is a portable device, the user preferences may be configured on an associated user system, such as a personal computer, and transferred to the device 12 during a synchronization process. The user preferences may alternatively be automatically provided or suggested by the media service 30 based on a play history of the device 12.

The online status 202 may be used to store a value indicating whether the user is currently online and logged into the media service 30.

The collection information 204 may include a record of each new media item collected by the user including those stored in the media collection 16 of the device 12, any home computer 212, desktop computer 214, or laptop computer 216 the user logs in from. The collection information 204 is segregated based on the machine on which it resides. That is, the media player 14 running as a client on a machine provides information about the media items found on the machine and provides a machine identifier for that machine to the central server 32. The collection information 204 may be collected and stored for each of these machines separately.

As described above, the play histories 38 are time and location tagged records of each of the media items played by the user 220. The friends list 206 is a list of users that the user wishes to receive recommendations from, and the group list 208 is a list of groupings of those friends, which may identify peer groups.

The user profile 210 includes statistics about the user's collection such as artist distribution 220, genre distribution 224, and release year distribution 226, for example.

The content repository 36 may include content descriptors 230 and content servers 232. The content servers 232 host and serve the media items 44. The content descriptors 230 may contain information identifying each media item 44 known by the central server 32, including a media fingerprint 234, a Globally Unique Identifier or GUID 236, metadata 238 for the media item 44, and a URL 240 that indicates the file locations on the content servers 232.

The request processor 40 may coordinate a user matching component 262, a content matching component 264, and a response formatter component 266, which functions as described below to generate and provide media recommendations to the device 12.

Figure 3:
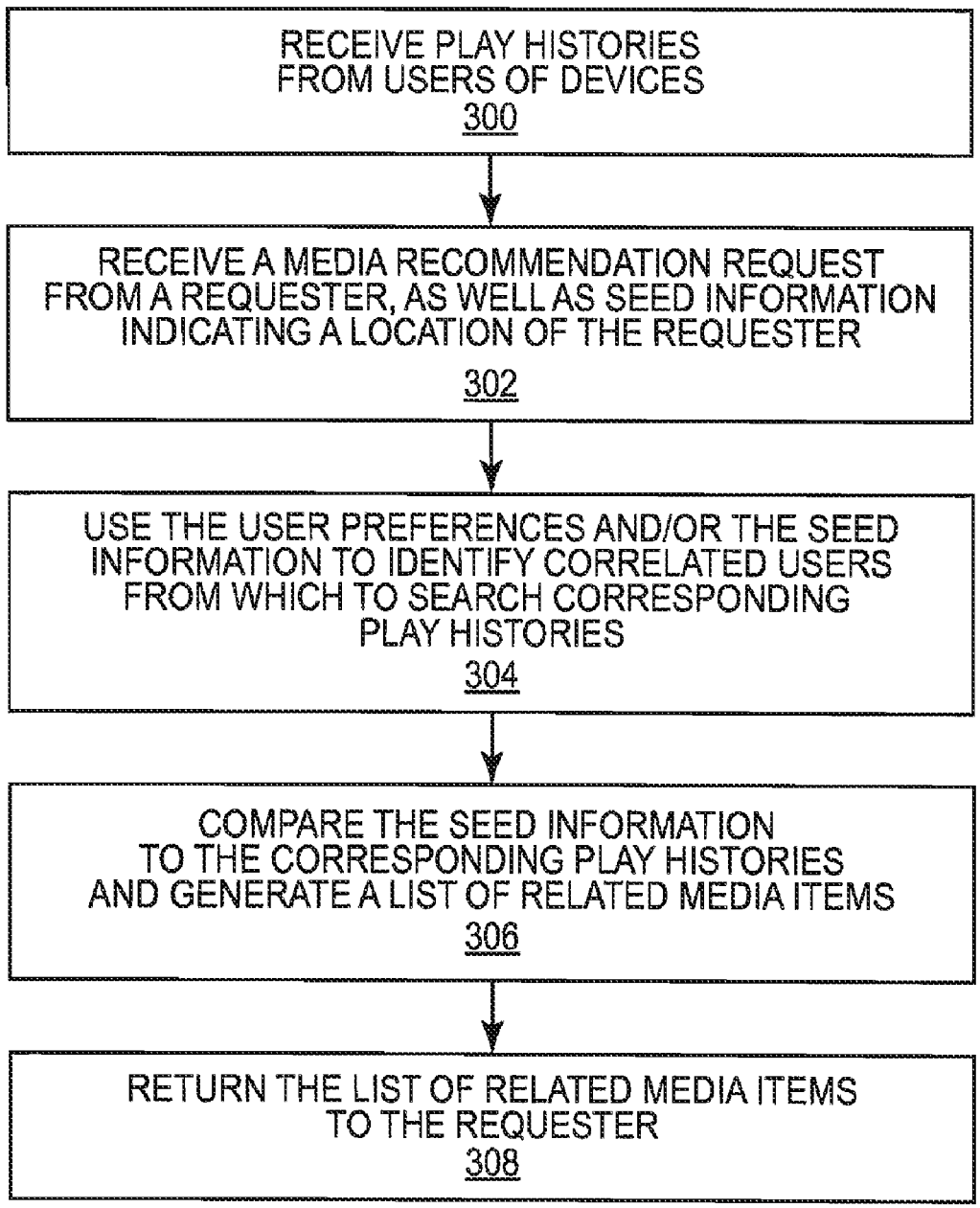
FIG. 3 is a flow diagram illustrating a process for generating media recommendations according to one embodiment of the present invention.

FIG. 3 is a flow diagram illustrating a process for generating media recommendations according to one embodiment of the present invention. The process begins by the central server 32 receiving a plurality of play histories 38 of media items from the users of devices 12, where the media items listed in the play histories 38 are tagged with corresponding time and location data indicating a time and location of play (block 300).

Figures 4, 5:
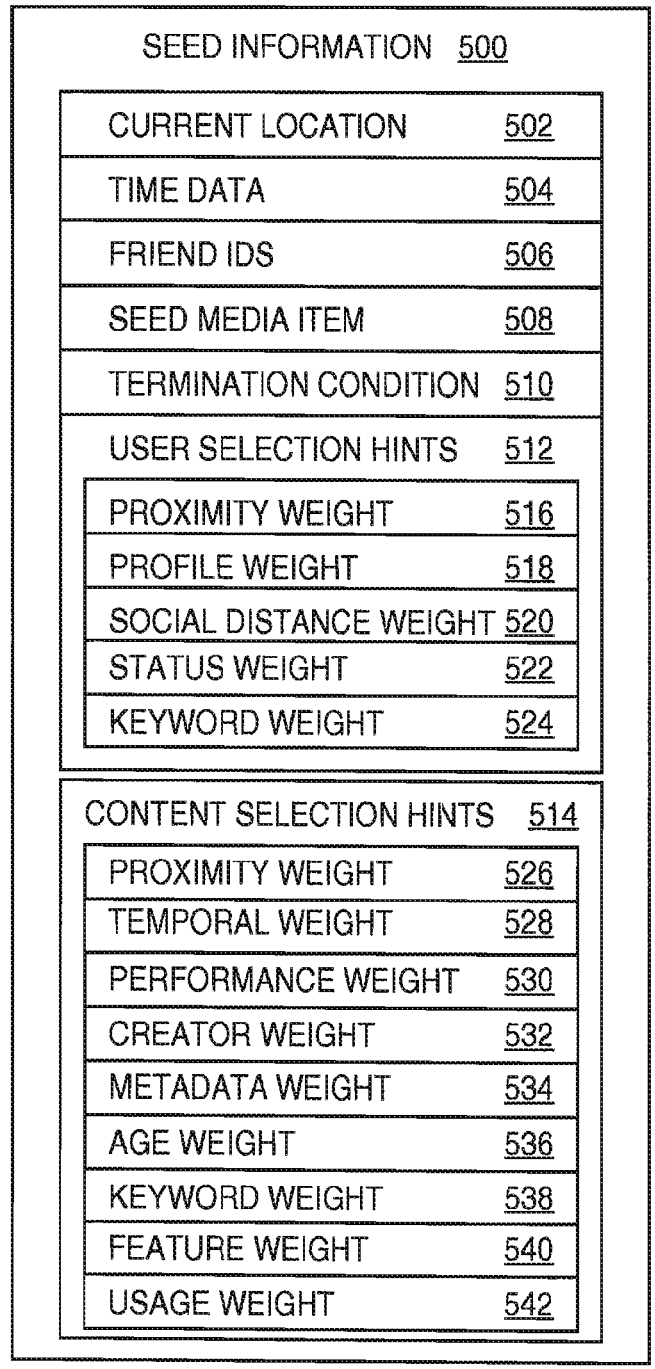
FIG. 4 is a block diagram illustrating an exemplary play history entry.
FIG. 5 is a block diagram illustrating exemplary seed information sent with the media recommendation request.

FIG. 4 is a block diagram illustrating a play history entry. The exemplary play history entry 400 includes a GUID 402 for identifying the media item, and a play location 404 and a timestamp 406 indicating the location and time of play, respectively. The play location 404 and a timestamp 406 may be of any format. For example, the play location 404 may comprise a GPS coordinate (latitude & longitude), an address, a ZIP code, a city, a neighborhood, and the like. The timestamp 406 may include the calendar date and time of day in Greenwich Mean Time (GMT), for example.

Referring again to FIG. 3, the central server 32 receives a media recommendation request 26 from a requester, including receiving seed information indicating a current location of the requester (block 302).

In one embodiment, the media recommendation request 26 may include the seed information. In another embodiment, the seed information may be sent to the central server 32 as additional information apart from the media recommendation request 26.

In response to receiving the media recommendation request 26, a component of the media service 30, such as the request processor 40, uses the user preferences 20 of the requester and/or the seed information to identify correlated users from which to search corresponding play histories from among the plurality of play histories 38 (block 304). In another embodiment, the seed information could be used to search the play histories 38 first, followed by a matching of the user preferences.

The seed information is then compared to the corresponding play histories and a list of related media items contained therein is generated (block 306). The list of related media items is then returned to the requester as a media recommendation 46 (block 308). Once received by the device 12, the media player 14 may automatically play the media items listed in the media recommendation 46.

In a further embodiment, the seed information 500 includes time data in addition to the current location of the requester, such that the media items in the play histories 38 may be correlated based at least in part on the current location of the requester and the time data from the seed information. Any internal or external time device of the device 12 may be suitable for including the time data in the seed information 500.

FIG. 5 is a block diagram illustrating exemplary seed information sent with the media recommendation request 26. According to the exemplary embodiment, the request processor 40 performs a two step process during the computation of related media items for the requester and uses the seed information 500 sent with the media recommendation request 26 during both steps to: 1) filter and correlate users and therefore the play histories 38; and 2) filter the play histories of the correlated users.

In one embodiment, the seed information 500 may comprise any combination of current location 502, time data 504, friend IDs 506, one or more seed media items 508, a termination condition 510, user selection hints 512, and content selection hints 514.

The current location 502 indicates the requesting device's current location. The time data 504 is another value that may be used to filter the play histories 38 to correlate the media items during media recommendation generation. The time data may indicate the time that the device 12 sent the media recommendation request 26. The time data 504 may also represent a different value. For example, the time data may be used to indicate a time cut-off value such that media items are selected that have timestamps 406 indicating the media items were played after the cut-off value (i.e., are newer). The current location 502 and the time data 504 may be formatted as described above with respect to the play location 404 and a timestamp 406.

The friends IDs 506 may be a list of user ID's of friends that the requester specifies that may be used to filter the play histories 38 to narrow which play histories 38 are searched. The seed media item 508 may be a seed song (preferably, just the metadata from the song), for example, that is used to find similar media items during media recommendation generation. The termination condition 510 may specify a number of media items to return in the media recommendation 46 and an optional time out condition.

The user selection hints 512 and the content selection hints 514 include user changeable values expressed as methods that may be used to control computation of which media items are recommended. Values for the current location 502, the time data 504, and friend IDs 506 may be used as inputs for values used in some of the methods of the user selection hints 512 and the content selection hints 514.

The user selection hints 512 are methods for correlating or filtering user accounts 34 (and therefore the users) to consider during the first step of the computation of selecting related media items for the requester. The user selection hints 512 ensure that only the play histories 38 of user accounts 34 having user preferences 20 closely correlated to the requester are searched for media recommendations.

In one embodiment, the user selection hints 512 may include a proximity weight 516, a profile weight 518, a social distance weight 520, a status weight 522, and a keyword weight 524. The proximity weight 516 searches only the play histories 38 of the users of devices 12 within proximity of the requester. This proximity can be calculated by determining if a last known current location 502 of the user's device 12 is within a threshold distance from the current location 502 of the requester's device 12.

The profile weight 518 searches the play histories 38 of the users that have user preferences less than a minimum distance between the requester's user preferences based on a profile matching scheme. The social distance weight 520 searches only the play histories 38 of the users within N steps of the requester within a social network. The status weight 522 searches only the play histories 38 of those users who have a current status of "online". The keyword weight 524 searches the play histories 38 of the users having keywords matching keywords provided by the requester.

The content selection hints 514 are methods of filtering the play histories 38 of the correlated users during the second step of the computation of selecting related media items for the requester to determine which media items will be considered. The content selection hints 514 may include a proximity weight 526, a temporal weight 528, a performance weight 530, a creator weight 532, a metadata weight 534, an age weight 536, a keyword weight 538, a feature rate 540, and a usage rate 542. The proximity weight 526 selects media items having a play location 404 within proximity of the current location 502 of the requester. Proximity can be calculated based on a threshold distance and may be configurable based on the specific application.

The temporal weight 528 selects media items having a time of access, as indicated via timestamp 406, which matches within a time threshold of the time data 504 specified in the seed information 500. The performance weight 530 selects media items having a live performance location within proximity of the current location 502 of the requester.

The creator weight 532 selects media items having groups who created the media items that were located within proximity of the current location of the media recommendation request. The metadata weight 534 selects media items having metadata that matches a criteria provided by the requester, such as genre, decade and the like. The age weight 536 selects media items having a time lapse since the media items were last accessed that matches a criteria provided by the requester. The keyword weight 538 selects media items having keywords matching keyword criteria provided by the requester. The feature weight 540 selects media items having specified features extracted from the media item and stored as metadata. The usage weight 542 contains information regarding how often the media item has been played and may be used as a usage histogram.

Figure 6:
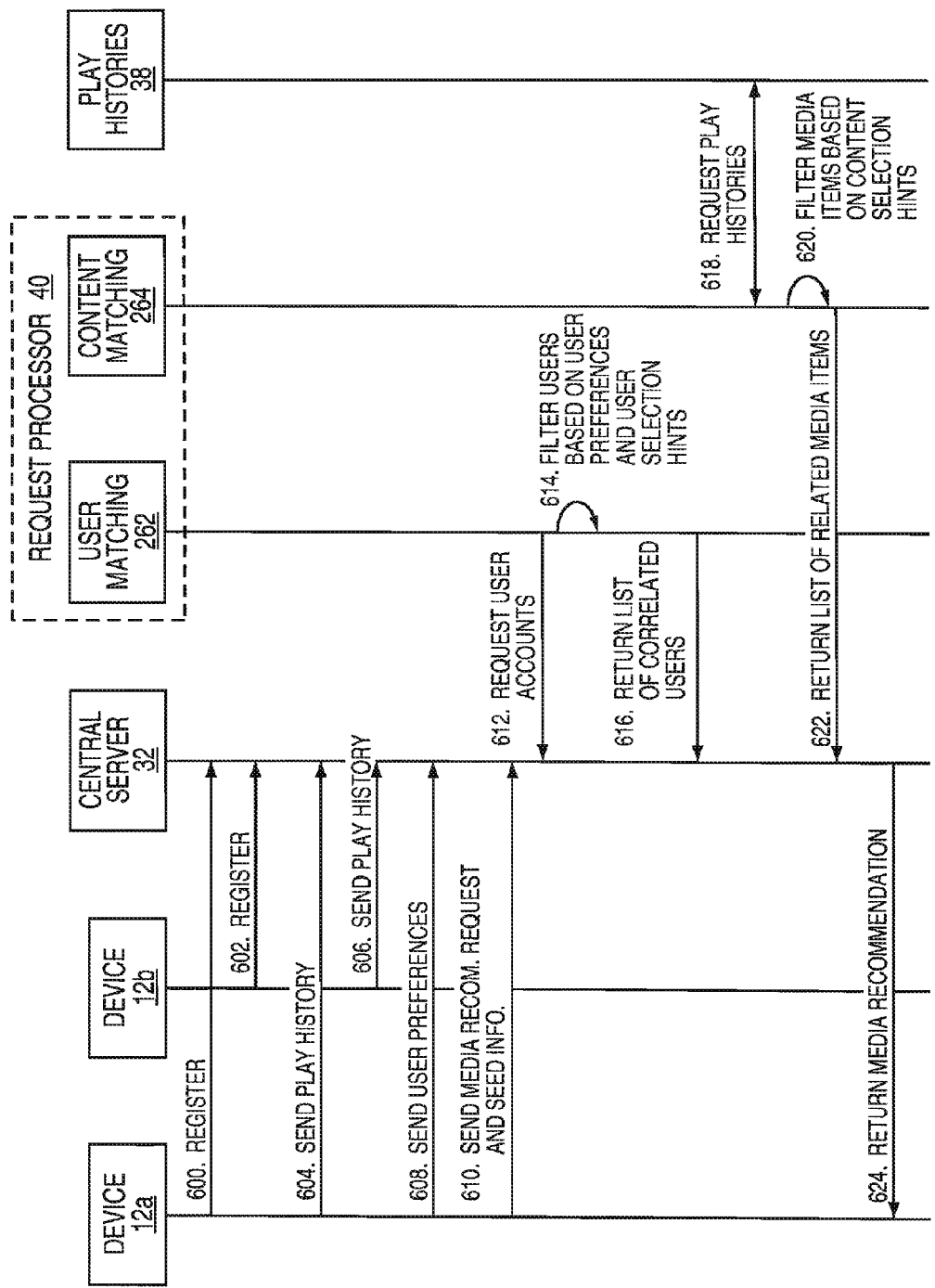
FIG. 6 is a flow diagram illustrating operation of the system for generating the media recommendations in response to media recommendation request in further detail.

FIG. 6 is a flow diagram illustrating operation of the system 10 for generating the media recommendations 46 in further detail. In this embodiment, the process begins with the devices 12*a* and 12*b* registering with a central server 32 (blocks 600 and 602). Registration may include the users of the devices 12*a* and 12*b* establishing accounts and becoming members of the media service 30 and uploading information identifying their respective devices 12*a* and 12*b*.

Device 12*a* may then send its play history 400 to the central server 32 (block 604), and device 12*b* may send its play history 400 to the central server 32 (block 606). As described above, the central server 32 stores the play histories 38 in association with the user accounts 34 of the users of the devices 12*a* and 12*b*. Device 12*a* may also send its user preferences 20 to the central server 32 (block 608).

Figures 7A, 7B:
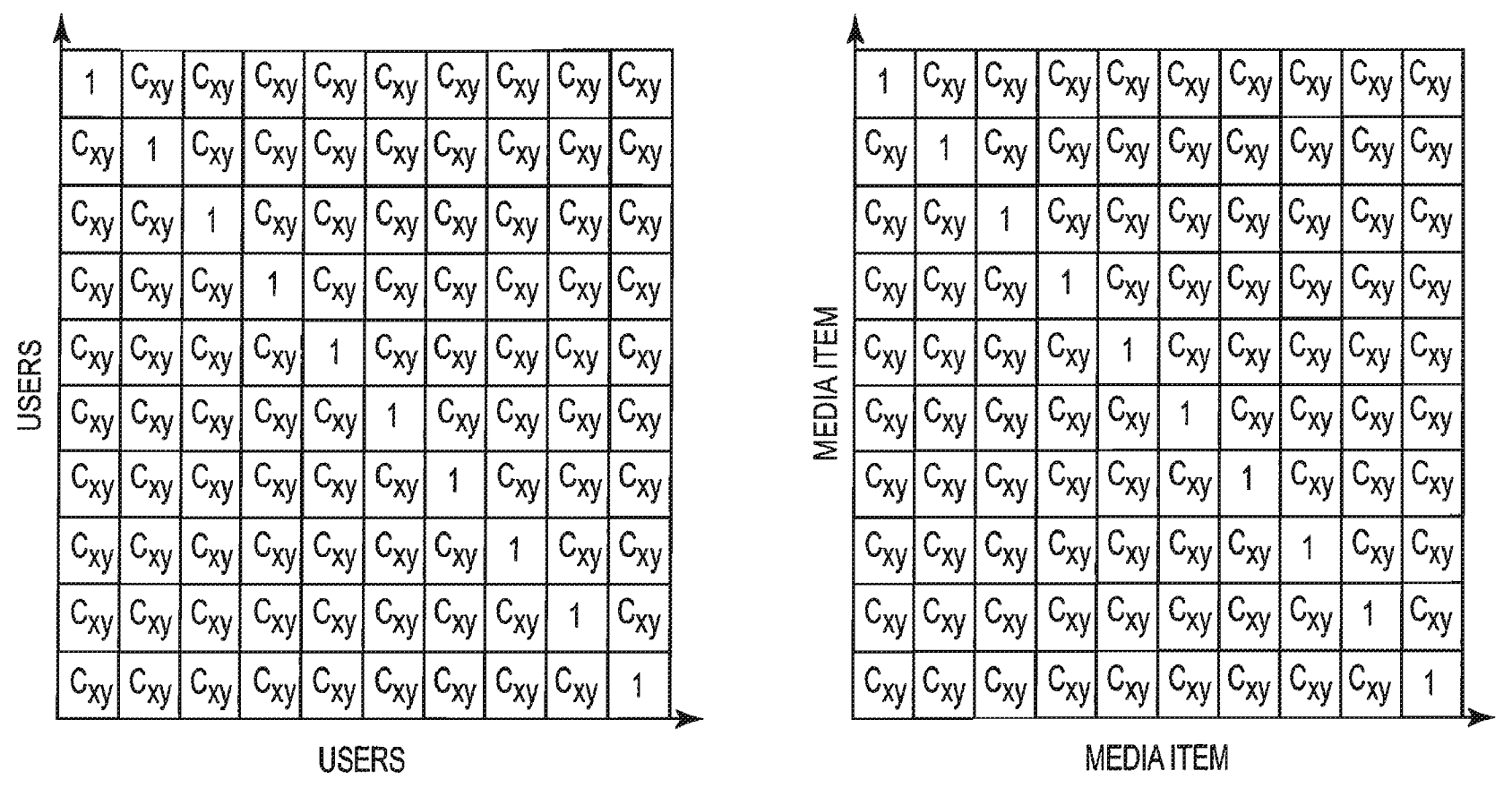

Sometime thereafter, device 12*a* may send a media recommendation request 26 and the seed information 500 to the central server 32 (block 610), which is then passed to the request processor 40. The user matching component 262 of the request processor 40 first requests the user accounts 34 from the central server 32 (block 612). In response to receiving the user accounts 34, the user matching component 262 filters the user accounts 34 based on the user preferences 20 and the user selection hints 512. That is, an evaluation function is used to compare the user preferences 20 and the user selection hints 512 sent from the device 12a with the user account 34 information of the other users and to compute a correlation between the users. The result of the computation for correlated users is represented pictorially in the table shown in FIG. 7A. The user matching component 262 ranks the items in the table, and returns the items having the highest correlation and in a list of correlated users to the central server 32 (block 616).

Next, the content matching component 264 of the request processor 40 requests the play histories 38 of the correlated users (block 618). In response to receiving the play histories 38 of the correlated users, the content matching component 264 filters the media items listed in the play histories 38 based on the content selection hints 514 from the seed information 500 (block 620). That is, the content matching component 264 uses an evaluation function to compare the content selection hints 514 with information regarding the media items 44 listed in the play histories 38 to compute the correlation between related or matching media items. The result of the computation for correlated media items is represented pictorially in the table shown in FIG. 7B. The content matching component 264 ranks the items in the table, and returns the items having the highest correlation and returns a list of related media items to the central server 32 (block 622).

The central server 32 then returns the list of related media items to the requesting device 12 as a media recommendation 46 (block 624).

In one embodiment, the list of correlated users (block 616) and the list of related media items (block 622) are processed into an intermediate results table, and then formatted into the media recommendation 46 by the response formatter 266 of the request processor 40.

FIG. 8 a block diagram illustrating an intermediate results table for the list of related media items; and FIG. 9 is a diagram illustrating the media recommendation 46.

Referring to FIG. 8, entries in the intermediate results table 800 may include a media ID 802 identifying the media item, a user ID 804 of the user from which the media item was recommended, a user weight 806, a media item weight 808, and a score 810. The user weight 806 represents a correlation value representing the degree of correlation between the requestor and the corresponding user, as calculated in table 7A. These correlation values are also influenced by the user weighting hints supplied in 512. In the case where optional Friend IDs 506 are explicitly supplied, the group of users specified in the Friend IDs 506 are the only users considered in the computation of 7A. The media item weight 808 represents a correlation value representing the degree of correlation between the optional seed media item 508 and the corresponding media items, as calculated in table 7B. When the requester does not supply a seed media item 508 is not supplied, a theoretical seed media item profile may be constructed from the content selection hints 514, and the correlation values in table 7B are in relation to this theoretical seed. The score 810 represents a function of the user weight 808 and the media item weight 808.

Once the intermediate results table 800 has been completed, the central server 32 sorts the entries according to the score 810, and removes any duplicates using media item IDS 802.

As shown in FIG. 9, the top N scoring media items are then formatted into media recommendation 46 and returned to the requesting device 12. In one embodiment, the media recommendation 46 includes the media ID 802 and the score 810. The media recommendation 46 may optionally include at least a portion of the original seed information 500, such as the current location 502 and the termination condition 510.

In one embodiment, the media ID 802 comprises information identifying the media item, such as a Globally Unique Identifier (GUID) for the song, a title of the song, or the like; a Uniform Resource Locator (URL) enabling other devices to obtain the song such as a URL enabling download or streaming of the song from the media service 30 or a URL enabling purchase and download of the song from an e-commerce service; a URL enabling download or streaming of a preview of the song from the media service 30 or a similar e-commerce service; metadata describing the song such as ID3 tags including, for example, genre, the title of the song, the artist of the song, the album on which the song can be found, the date of release of the song or album, the lyrics, and the like. Alternatively the media recommendation 46 may also include the user IDs 804 of the users from which the related media items were recommended.

Figure 10:
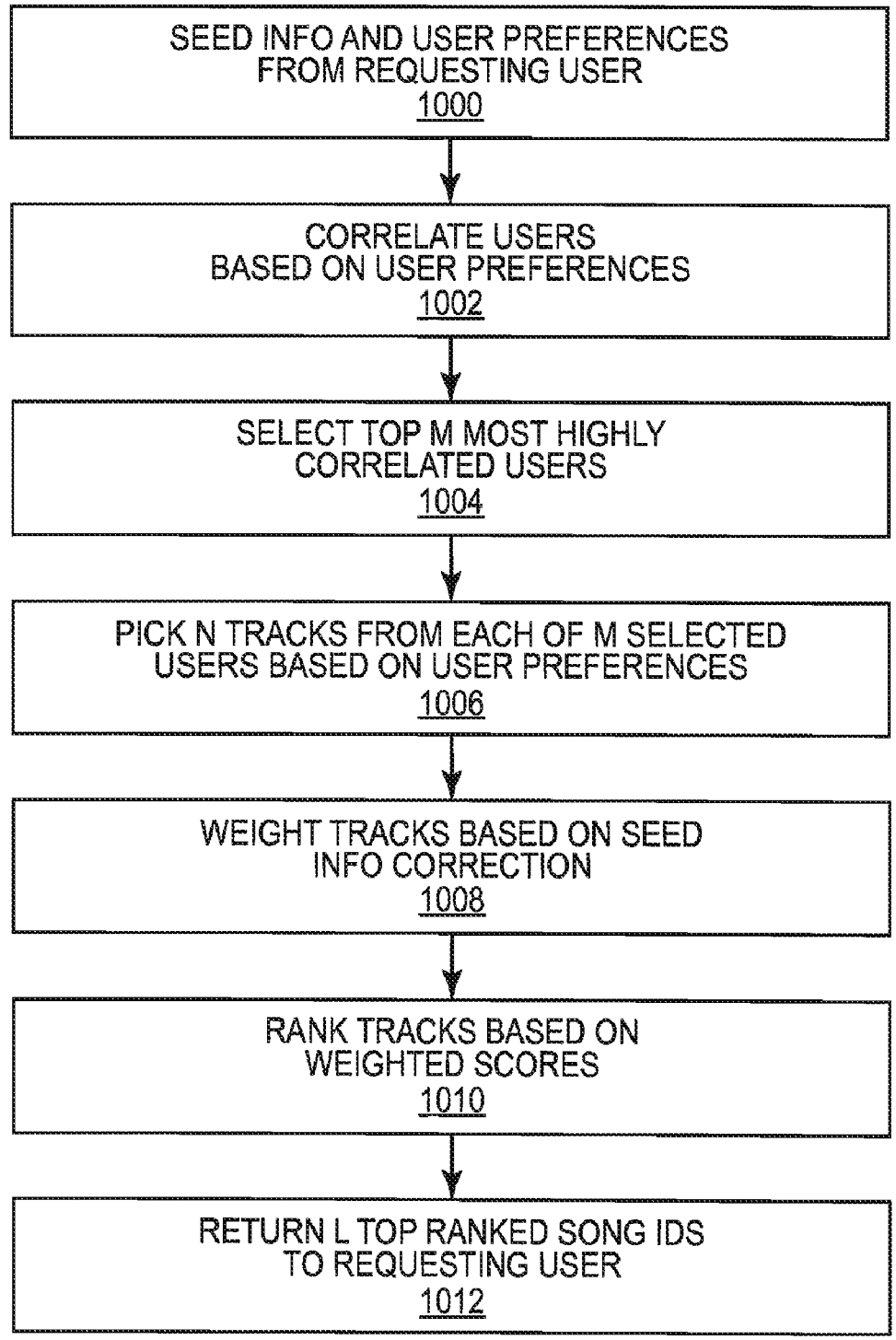
FIG. 10 is a flow diagram illustrating a process for generating a media recommendation in an environment where the media items are songs.

FIG. 10 is a flow diagram illustrating a process for generating a media recommendation 46 in an environment where the media items are songs. The process begins by central server 32 receiving the seed information 500 and the user preferences 20 from the requesting user (block 1000). The user accounts 34 are then correlated based on the user preferences 20 (block 1002). The top M most highly correlated users are then selected (block 1004). This corresponds to block 614 from FIG. 6.

Next, N songs from each of the M correlated users are selected based on the user preferences 20 (block 1006). In one embodiment, N may represent the N most frequently played songs from the play histories 38 of each of the M correlated users. Weights are assigned to the selected songs based on seed information 500 (block 1008). Seed information fields 502, 504, 506, and 510 may all be optional, but at least one must be specified. Thereafter, the weighted songs are ranked based on the assigned weights (block 1010). Blocks 1006 through blocks 1010 correspond to block 620 from FIG. 6.

The central server 32 then returns the L top ranked song IDs to the requesting user as the media recommendation 46 (block 1012).

A method and system for generating a media recommendation has been disclosed. The present invention has been described in accordance with the embodiments shown, and one of ordinary skill in the art will readily recognize that there could be variations to the embodiments that would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A computer-implemented method for generating a media recommendation, comprising:
receiving by a server from a plurality of user devices a plurality of play histories of media items played by a plurality of users, wherein each play history of the plurality of play histories indicates media items played by a corresponding one of the plurality of users and is tagged with time and location of play for each of at least a portion of the media items indicated in the play history;

receiving by the server a media recommendation request from a requester, including receiving seed information, wherein the received seed information indicates a current location of the requester;

comparing the received seed information to at least a subset of the plurality of play histories to generate a list of related media items from the at least a subset of the plurality of play histories; and sending the list of related media items to the requester.

2. The computer-implemented method of claim 1 wherein the received seed information further comprises time data.

3. The computer-implemented method of claim 2 wherein comparing the received seed information to the at least a subset of the plurality of play histories comprises correlating the media items in the at least a subset of the plurality of play histories based on the current location of the requester and the time data from the seed information.

4. The computer-implemented method of claim 3 wherein the time data represents one of a time that the media recommendation request was sent, and a time cut-off value, wherein the time cut-off value is used to select media items having corresponding time and location data that indicate the media items were played after the time cut-off value.

5. The computer-implemented method of claim 1 wherein the seed information further comprises a list of user ID's of friends received from the requester that is used to filter the plurality of play histories.

6. The computer-implemented method of claim 1 wherein the seed information further comprises a seed media item that is used to find similar media items during generation of the list of related media items.

7. The computer-implemented method of claim 1 wherein the seed information further comprises a termination condition that specifies a number of media items to return in the list of related media items.

8. The computer-implemented method of claim 1 wherein the seed information further comprises user selection methods for correlating users from the plurality of users.

9. The computer-implemented method of claim 8 wherein the user selection methods include a proximity weight that searches only play histories of a plurality of users within proximity of the requester.

10. The computer-implemented method of claim 8 wherein the user selection methods include a profile weight that searches only play histories of a plurality of users that have user preferences less than a minimum distance between at least one user preference of the requester based on a profile matching scheme.

11. The computer-implemented method of claim 8 wherein the user selection methods include a social distance weight that searches only play histories of a plurality of users within N steps of the requester within a social network.

12. The computer-implemented method of claim 8 wherein the user selection methods include a status weight that searches only play histories of a plurality of users who have a current status of "online."

13. The computer-implemented method of claim 1 wherein the seed information further comprises content selection methods for filtering the plurality of play histories.

14. The computer-implemented method of claim 13 wherein the content selection methods include a proximity weight that selects media items having a play location within proximity of the current location of the requester.

15. The computer-implemented method of claim 13 wherein the content selection methods include a temporal weight that selects media items having a time of access that matches within a time threshold of time data specified in the seed information.

16. The computer-implemented method of claim 13 wherein the content selection methods include a performance weight that selects media items having a live performance location within proximity of the current location of the requester.

17. The computer-implemented method of claim 13 wherein the content selection methods include a creator weight that selects media items having groups who created the media items that were located within proximity of the current location of the media recommendation request.

18. The computer-implemented method of claim 13 wherein the content selection methods include an age weight that selects media items having a time that has lapsed since the media items were last accessed that matches a criteria provided by the requester.

19. A server comprising:
a processor configured to:
receive from a plurality of devices a plurality of play histories of media items played by a plurality of users, wherein each play history of the plurality of play histories indicates media items played by a corresponding one of the plurality of users and is tagged with time and location of play for each of at least a portion of the media items indicated in the play history;
receive a media recommendation request from a requester, including receiving seed information, wherein the received seed information indicates a current location of the requester;
compare the received seed information to at least a subset of the plurality of play histories to generate a list of related media items from the at least a subset of the plurality of play histories; and
send the list of related media items to the requester.

20. The server of claim 19 wherein the received seed information further comprises time data.

21. The server of claim 20 wherein comparing the received seed information to the at least a subset of the plurality of play histories comprises correlating the media items in the at least a subset of the plurality of play histories based on the current location of the requester and the time data from the seed information.

22. The server of claim 21 wherein the time data represents one of a time that the media recommendation request was sent, and a time cut-off value, wherein the time cut-off value is used to select media items having corresponding time and location data that indicate the media items were played after the time cut-off value.

23. The server of claim 19 wherein the seed information further comprises a list of user ID's of friends specified by the requester that is used to filter the plurality of play histories.

24. The server of claim 19 wherein the seed information further comprises a seed media item that is used to find similar media items during generation of the list of related media items.

25. The server of claim 19 wherein the seed information further comprises a termination condition that specifies a number of media items to return in the list of related media items.

26. The server of claim 19 wherein the seed information further comprises user selection methods for correlating users from the plurality of users.

27. The server of claim 26 wherein the user selection methods include a proximity weight that searches only play histories of a plurality of users within proximity of the requester.

28. The server of claim 26 wherein the user selection methods include a profile weight that searches only play histories of a plurality of users that have user preferences less than a minimum distance between at least one user preference of the requester based on a profile matching scheme.

29. The server of claim 26 wherein the user selection methods include a social distance weight that searches only play histories of a plurality of users having a received location and that are within N steps of the requester within a social network.

30. The server of claim 26 wherein the user selection methods include a status weight that searches only play histories of a plurality of users who have a current status of "online."

31. The server of claim 19 wherein receiving the seed information further comprises receiving content selection methods for filtering the plurality of play histories.

32. The server of claim 31 wherein the content selection methods include a proximity weight that selects media items having a play location within proximity of the current location of the requester.

33. The server of claim 31 wherein the content selection methods include a temporal weight that selects media items having a time of access that matches within a time threshold of time data specified in the seed information.

34. The server of claim 31 wherein the content selection methods include a performance weight that selects media items having a live performance location within proximity of the current location of the requester.

35. The server of claim 31 wherein the content selection methods include a creator weight that selects media items having groups who created the media items that were located within proximity of the current location of the media recommendation request.

36. The server of claim 31 wherein the content selection methods include an age weight that selects media items having a time lapse since the media items were last accessed that matches a criteria received from the requester.

37. A non-transitory computer readable medium comprising software with instructions to cause a computer to:
   receive from a plurality of devices a plurality of play histories of media items played by a plurality of users, wherein each play history of the plurality of play histories indicates media items played by a corresponding one of the plurality of users and is tagged with time and location of play for each of at least a portion of the media items indicated in the play history;
   receive a media recommendation request from a requester, including receiving seed information, wherein the received seed information indicates a current location of the requester;
   compare the received seed information to at least a subset of the plurality of play histories to generate a list of related media items from the at least a subset of the plurality of play histories; and
   send the list of related media items to the requester.

* * * * *